United States Patent
Ding et al.

(10) Patent No.: US 11,414,913 B2
(45) Date of Patent: Aug. 16, 2022

(54) TRAIN DOOR CONTROL METHOD AND SYSTEM

(71) Applicant: BYD COMPANY LIMITED, Shenzhen (CN)

(72) Inventors: Jian Ding, Shenzhen (CN); Faping Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 684 days.

(21) Appl. No.: 16/472,436

(22) PCT Filed: Dec. 22, 2017

(86) PCT No.: PCT/CN2017/117998
§ 371 (c)(1),
(2) Date: Jun. 21, 2019

(87) PCT Pub. No.: WO2018/113777
PCT Pub. Date: Jun. 28, 2018

(65) Prior Publication Data
US 2021/0131163 A1    May 6, 2021

(30) Foreign Application Priority Data
Dec. 23, 2016  (CN) .......................... 201611208235.5

(51) Int. Cl.
*E05F 15/79* (2015.01)
*B61B 1/02* (2006.01)
(Continued)

(52) U.S. Cl.
CPC ................ *E05F 15/79* (2015.01); *B61B 1/02* (2013.01); *B61D 19/00* (2013.01); *B61L 27/04* (2013.01); *B61L 27/40* (2022.01); *E05Y 2900/51* (2013.01)

(58) Field of Classification Search
CPC . E05F 15/79; E05F 15/70; E05F 17/00; E05F 17/004; E05F 2017/005; B61B 1/02;
(Continued)

(56) References Cited

U.S. PATENT DOCUMENTS

2004/0068361 A1* 4/2004 Cross ..................... B61L 27/40
701/117
2013/0344802 A1* 12/2013 Armour .............. H04W 84/005
455/39

FOREIGN PATENT DOCUMENTS

CN            1128009 A       7/1996
CN         101056787 A      10/2007
(Continued)

OTHER PUBLICATIONS

The World Intellectual Property Organization (WIPO) International Search Report for PCT/CN2017/117998 dated Mar. 21, 2018 8 Pages.

*Primary Examiner* — Russell Frejd
(74) *Attorney, Agent, or Firm* — Anova Law Group, PLLC (57) ABSTRACT

A train door control method and system are provided. The train door control method includes: acquiring a first train identifier and a second train identifier when multiple trains park in a platform at the same time, a door of a first train to which the first train identifier belongs being to be opened at a current time point, and a second train to which the second train identifier belongs being a train arranged behind the first train, which enters the platform and parks in the platform; and controlling the opening and closing of the door of the first train and a door of the second train at different time points respectively according to the first train identifier and the second train identifier.

16 Claims, 7 Drawing Sheets

---

Acquire a first train identifier and a second train identifier when multiple trains park in a platform at the same time, a door of a first train to which the first train identifier belongs being to be opened at a current time point, and a second train to which the second train identifier belongs being a train arranged behind the first train, which enters the platform and parks in the platform — S11

Control the opening and closing of the door of the first train and a door of the second train at different time points respectively according to the first train identifier and the second train identifier — S12

(51) Int. Cl.
*B61D 19/00* (2006.01)
*B61L 27/04* (2006.01)
*B61L 27/40* (2022.01)

(58) Field of Classification Search
CPC ......... B61D 19/00; B61L 27/04; B61L 27/40;
B61L 25/04; E05Y 2900/51; E05Y
2900/531; E05Y 2400/42; B60J 5/04
See application file for complete search history.

(56) References Cited

FOREIGN PATENT DOCUMENTS

| | | | |
|---|---|---|---|
| CN | 102069826 | A | 5/2011 |
| CN | 103670114 | A | 3/2014 |
| CN | 105416345 | A | 3/2016 |
| CN | 105781318 | A | 7/2016 |
| CN | 106218647 | A | 12/2016 |
| JP | 2001328531 | A | 11/2001 |

* cited by examiner

TRAIN DOOR CONTROL METHOD AND SYSTEM

CROSS-REFERENCE TO RELATED APPLICATIONS

This application is a national phase entry under 35 U.S.C. § 371 of International Application No. PCT/CN2017/117998, filed on Dec. 22, 2017, which claims priority to Chinese Patent Application No. 201611208235.5, filed on Dec. 23, 2016, content of all of which is incorporated herein by reference in its entirety.

FIELD

The present application relates to the technical field of train communications and, in particular, to a train door control method and system.

BACKGROUND

With the development of urban rail transit, subway screen doors have been widely used, and train doors and platform doors have been linked. After a train stops at a platform, the train doors and the platform doors are automatically opened and closed. In the related art, a unified control instruction is used to control the doors of the trains.

SUMMARY

An objective of this application is to at least resolve one of the technical problems in the related art to some extent.

In view of this, the present application is directed to a train door control method, which can ensure the safety of train operation, improve the operational efficiency of trains and improve the flexibility of the train door control method.

The present application is also directed to a train door control system.

To achieve the above objectives, a first aspect embodiment of the present application provides a train door control method, which includes: acquiring a first train identifier and a second train identifier when multiple trains park in a platform at the same time, where a door of a first train to which the first train identifier belongs is to be opened at a current time point, and a second train to which the second train identifier belongs is a train arranged after the first train, which enters the platform and parks in the platform; and controlling the opening and closing of the door of the first train and a door of the second train at different time points respectively according to the first train identifier and the second train identifier.

According to the train door control method provided by the first aspect embodiment of the present application, when multiple trains park in a platform at the same time, a first train identifier and a second train identifier are acquired, where a door of a first train to which the first train identifier belongs is to be opened at a current time point, and a second train to which the second train identifier belongs is a train arranged after the first train, which enters the platform and parks in the platform; and the opening and closing of the door of the first train and a door of the second train are controlled at different time points respectively according to the first train identifier and the second train identifier. The safety of train operation can be ensured, the operational efficiency of trains can be improved, and the flexibility of the train door control method can be improved.

To achieve the above objectives, a second aspect embodiment of the present application provides a train door control system, which includes: a logic control circuit board and signal system SIG, the logic control circuit board and signal system SIG including: a first acquisition module, configured to acquire a first train identifier and a second train identifier when multiple trains park in a platform at the same time, a door of a first train to which the first train identifier belongs being to be opened at a current time point, and a second train to which the second train identifier belongs being a train arranged behind the first train, which enters the platform and parks in the platform; and a control module, configured to control the opening and closing of the door of the first train and a door of the second train at different time points respectively according to the first train identifier and the second train identifier.

According to the train door control system provided by the second aspect embodiment of the present application, when multiple trains park in a platform at the same time, a first train identifier and a second train identifier are acquired, where a door of a first train to which the first train identifier belongs is to be opened at a current time point, and a second train to which the second train identifier belongs is a train arranged after the first train, which enters the platform and parks in the platform; and the opening and closing of the door of the first train and a door of the second train are controlled at different time points respectively according to the first train identifier and the second train identifier. The safety of train operation can be ensured, the operational efficiency of trains can be improved, and the flexibility of the train door control method can be improved.

To achieve the above objectives, a third aspect embodiment of the present application provides a computer storage medium for storing computer instructions, where the above method is performed when the computer instructions are executed by a controller of a device.

Additional aspects and advantages of embodiments of the present application will be given in part in the following descriptions, become apparent in part from the following descriptions, or be learned from the practice of the embodiments of the present application.

BRIEF DESCRIPTION OF THE DRAWINGS

These and other aspects and advantages of embodiments of the present application will become apparent and more readily appreciated from the following descriptions made with reference to the drawings, in which.

DETAILED DESCRIPTION

The following describes in detail embodiments of the present application. Examples of the embodiments are shown in the accompanying drawings, where reference signs that are the same or similar may represent same or similar components or components that have same or similar functions. The following embodiments described with reference to the accompanying drawings are exemplary, and are intended to describe the present application and not to limit the present application. Rather, the embodiments of the present application include all changes, modifications and equivalents falling within the spirit and scope of the appended claims.

Figure 1:
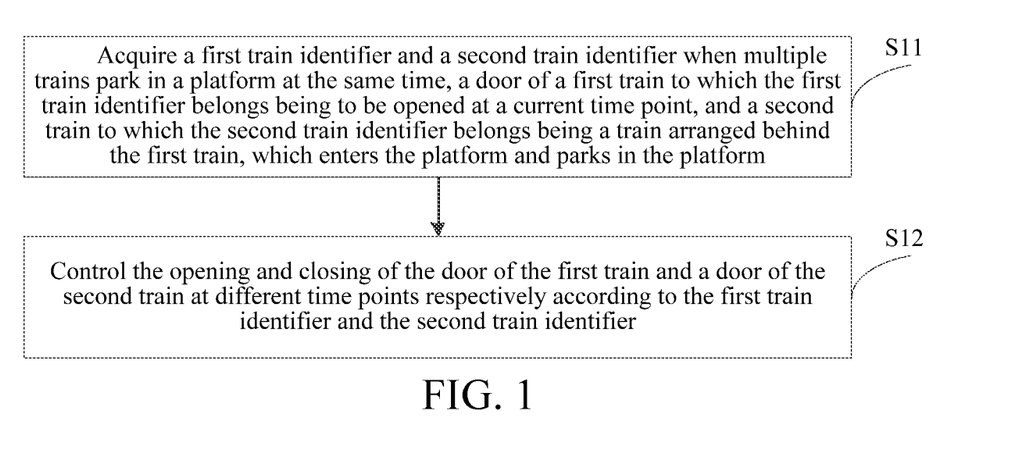
FIG. 1 is a schematic flowchart of a train door control method according to an embodiment of the present application.

FIG. 1 is a flowchart of a train door control method according to an embodiment of the present application.

Referring to FIG. 1, the train door control method includes the following steps:

Step S11: Acquire a first train identifier and a second train identifier when multiple trains park on a platform at the same time.

A door of a first train to which the first train identifier belongs is to be opened at a current time point, and a second train to which the second train identifier belongs is a train arranged after the first train, which enters the platform and parks on the platform.

Since doors of trains are controlled by unified control instructions in the related art, there is a lack of flexibility, and it is not suitable for situations where platform doors and train doors do not match. For example, when one platform has a unified direction, and two trains A and B park thereon at the same time, doors of the trains A and B need to be controlled separately, and the operation efficiency of the trains is low.

Figure 2:
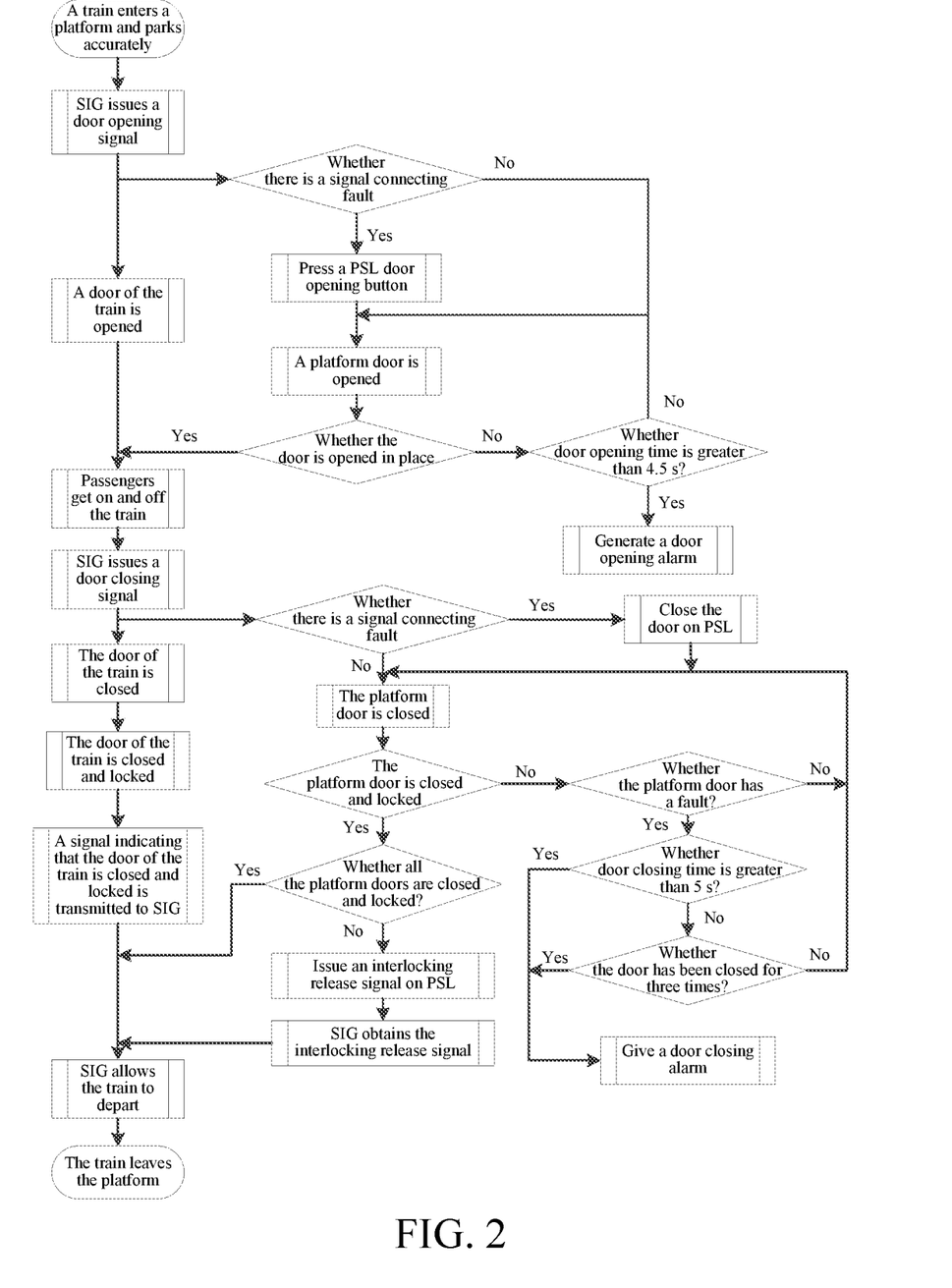
FIG. 2 is a schematic flowchart of a train door control method for a single train according to an embodiment of the present application.

An example is shown in FIG. 2. FIG. 2 is a schematic flowchart of a train door control method for a single train according to an embodiment of the present application. PSL is a local control panel. As can be seen from FIG. 2, the train door control method for the single train has a safety strategy such as door opening, closing and locking, which can ensure the safe operation of the train. It is to be noted that values 4.5 s, 5 s, and 3 times shown in FIG. 2 are only used as examples, and are not limited by the present application.

In the embodiment of the present application, external professional interfaces such as an independent logic control circuit board and signal system SIG and a local control panel PSL are used to transmit signals. When one of the interfaces fails, the normal operation of the other interfaces is not affected. Therefore, in the maintenance of related faults, the normal running of the system and the operation of the train cannot be affected, and by controlling each train door and platform door separately, multiple trains can park on one platform, which can ensure the safety of train operation, improve the operational efficiency of trains and improve the flexibility of the train door control method.

In an embodiment of the present application, the first train identifier is used to uniquely identify the first train and the second train identifier is used to uniquely identify the second train.

In a specific implementation, when multiple trains park in the platform at the same time, specifically, when a stop position of the first train at the platform is accurate and the door of the first train is to be opened at the current time point, the logic control circuit board and signal system SIG acquires a first train identifier to trigger a first opening instruction for opening the door of the first train; and after the second train stops steadily and accurately after the first train, the logic control circuit board and signal system SIG acquires a second train identifier to trigger a second opening instruction for opening the door of the second train.

S12: Control the opening and closing of the door of the first train and a door of the second train at different time points respectively according to the first train identifier and the second train identifier.

Since the first train is arranged in front of the second train, the logic control circuit board and signal system SIG may first control the door of the first train to be opened, and control the door of the second train to be opened after a period of time, so that the operational efficiency of trains can be improved under the premise of ensuring safety.

Similarly, the logic control circuit board and signal system SIG may first control the door of the first train to be closed, and control the door of the second train to be closed after a period of time. By controlling doors of multiple trains respectively, there is a before-after related logical relationship therebetween, which can guarantee the personal safety of passengers and improve the operational efficiency of trains based on the premise of ensuring the driving safety of trains.

Further, a first opening instruction for controlling the door of the first train to be opened may be generated according to the first train identifier, and the opening of the door of the first train may be controlled according to the first opening instruction; a second opening instruction for controlling the door of the second train to be opened may be generated according to the second train identifier at a time point of a first preset time interval after controlling the door of the first train to be opened according to the first opening instruction; the opening of the door of the second train may be controlled according to the second opening instruction; a first closing instruction for controlling the door of the first train to be closed may be generated according to the first train identifier at a time point of a second preset time interval after controlling the door of the second train to be opened according to the second opening instruction, and the closing of the door of the first train may be controlled according to the first closing instruction; a second closing instruction for controlling the door of the second train to be closed may be generated according to the second train identifier after controlling the door of the first train to be closed according to the first closing instruction; and the closing of the door of the second train may be controlled according to the second closing instruction, so as to control the opening and closing of the door of the first train and the door of the second train at different time points respectively.

Figure 3:
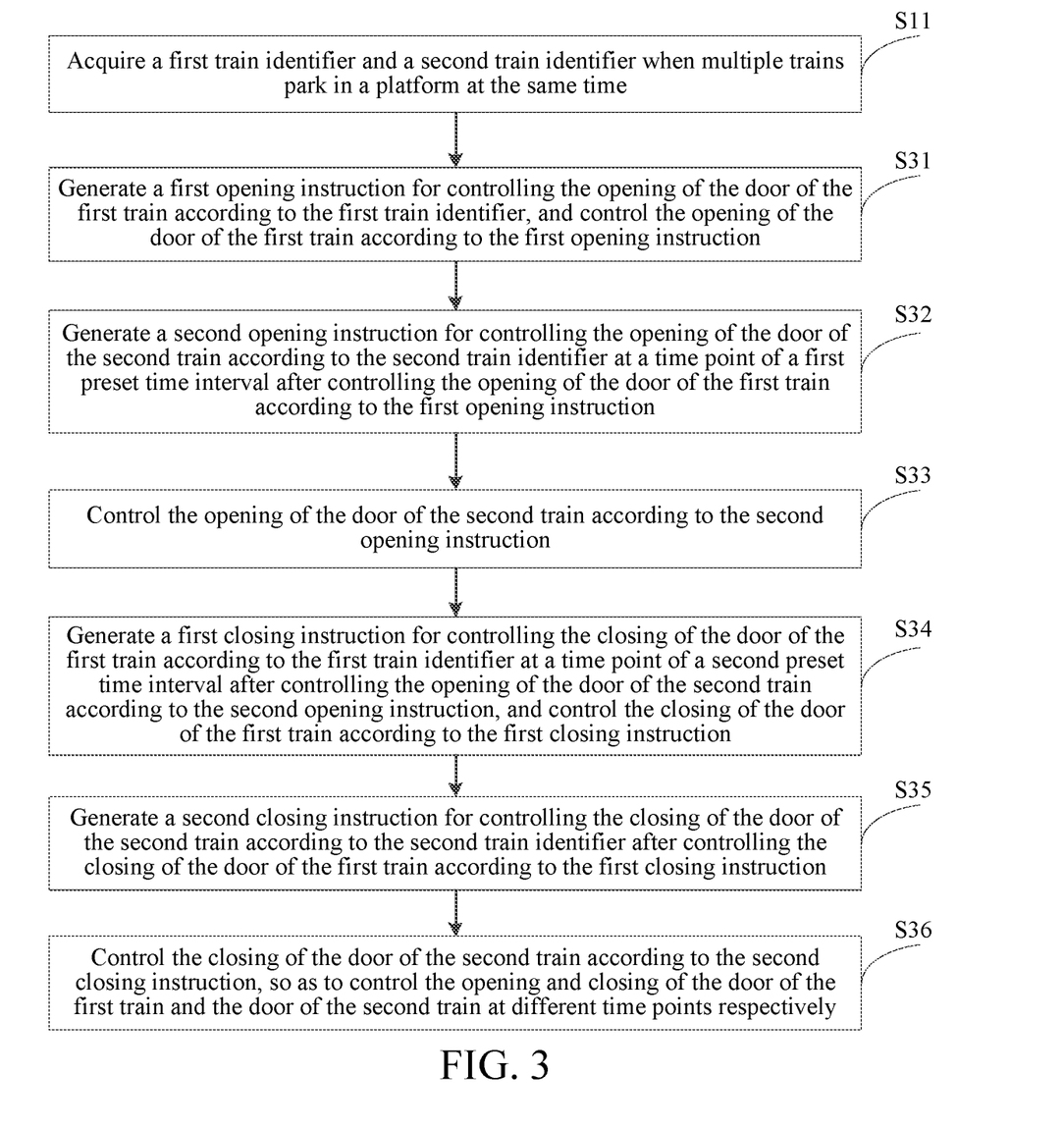
FIG. 3 is a schematic flowchart of a train door control method according to another embodiment of the present application.

In some embodiments, referring to FIG. 3, step S12 specifically includes the following steps:

S31: Generate a first opening instruction for controlling the door of the first train to be opened according to the first train identifier, and control the door of the first train to be opened according to the first opening instruction.

In the embodiment of the present application, the first opening instruction is used to control the door of the first train to be opened, and the first opening instruction may be triggered by the logic control circuit board and signal system SIG.

Specifically, when the door of the first train is to be opened at the current time point, the logic control circuit board and signal system SIG may generate a first opening instruction for controlling the door of the first train to be opened, and control the door of the first train to be opened according to the first opening instruction. Then, the door of the first train is opened, and passengers get on and off the first train.

S32: Generate a second opening instruction for controlling the door of the second train to be opened according to the second train identifier at a time point of a first preset time interval after controlling the door of the first train to be opened according to the first opening instruction.

The first preset time interval may be set by related technical staff of a train control center, or the first preset time interval may be set by a driver of the train. This is not limited thereto.

In the embodiment of the present application, the second opening instruction is used to control the door of the second train to be opened, and the second opening instruction may be triggered by the logic control circuit board and signal system SIG.

Specifically, the logic control circuit board and signal system SIG may generate a second opening instruction for controlling the door of the second train to be opened at a time point of a first preset time interval after the logic control circuit board and signal system SIG controls the door of the first train to be opened according to the first opening instruction. The orderly operation of trains when multiple trains park in the platform at the same time can be ensured.

S33: Control the door of the second train to be opened according to the second opening instruction.

Specifically, the logic control circuit board and signal system SIG controls the door of the second train to be opened according to the second opening instruction. Then, the door of the second train is opened, and passengers get on and off the second train.

S34: Generate a first closing instruction for controlling the door of the first train to be closed according to the first train identifier at a time point of a second preset time interval after controlling the door of the second train to be opened according to the second opening instruction, and control the door of the first train to be closed according to the first closing instruction.

The second preset time interval may be set by related technical staff of a train control center, or the second preset time interval may be set by a driver of the train, which is not limited thereto.

In the embodiment of the present application, the first preset time interval and the second preset time interval may be the same or different.

In the embodiment of the present application, the first closing instruction is used to control the door of the first train to be closed, and the first closing instruction may be triggered by the logic control circuit board and signal system SIG.

Specifically, the logic control circuit board and signal system SIG may generate a first closing instruction for controlling the door of the first train to be closed at a time point of a second preset time interval after controlling the door of the second train to be opened according to the second opening instruction, and control the door of the first train to be closed according to the first closing instruction. Then, the door of the first train is closed and locked.

S35: Generate a second closing instruction for controlling the door of the second train to be closed according to the second train identifier after controlling the door of the first train to be closed according to the first closing instruction.

In the embodiment of the present application, the second closing instruction is used to control the door of the second train to be closed, and the second closing instruction may be triggered by the logic control circuit board and signal system SIG.

Specifically, after the door of the first train is closed and locked, a signal indicating that the door of the first train is closed and locked is transmitted to the logic control circuit board and signal system SIG, the logic control circuit board and signal system SIG allows the first train to depart, the first train leaves the platform, and when the logic control circuit board and signal system SIG acquires a signal indicating that the first train has left the platform, a second closing instruction for controlling the door of the second train to be closed may be generated according to the second train identifier.

In the embodiment of the present invention, the logic control circuit board and signal system SIG may detect whether a signal indicating that the first train has left the platform is acquired, and may generate a second closing instruction for controlling the door of the second train to be closed according to the second train identifier when the signal is detected.

Figure 4:
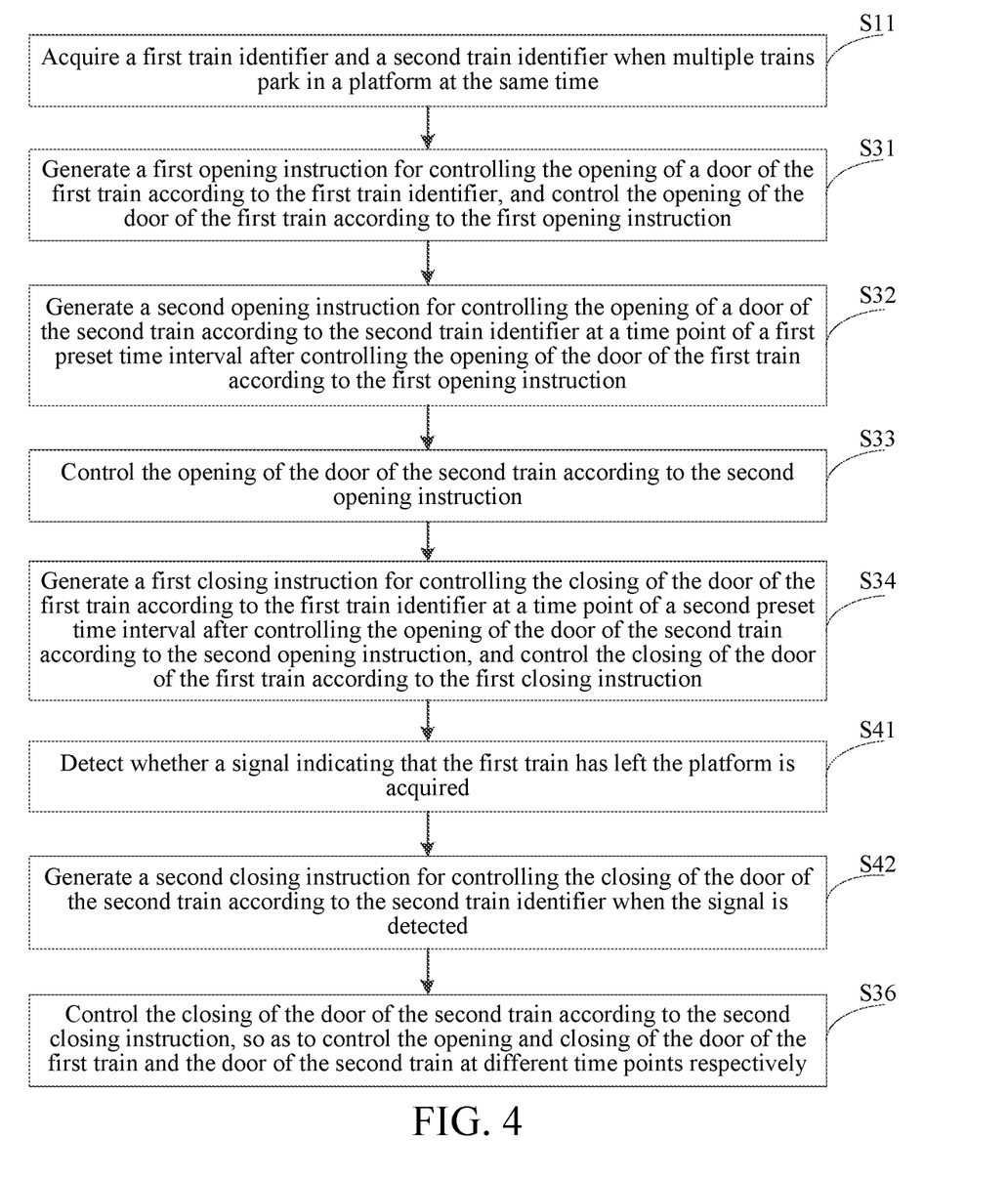
FIG. 4 is a schematic flowchart of a train door control method according to another embodiment of the present application.

In some embodiments, referring to FIG. 4, step S35 specifically includes the following steps:

S41: Detect whether a signal indicating that the first train has left the platform is acquired.

Specifically, the logic control circuit board and signal system SIG detects whether a signal indicating that the first train has left the platform is acquired. When the logic control circuit board and signal system SIG detects that the signal indicating that the first train has left the platform is not acquired, the logic control circuit board and signal system SIG does not perform any processing at this moment. Only when the logic control circuit board and signal system SIG detects that the signal indicating that the first train has left the platform is acquired, a second closing instruction for closing the door of the second train can be triggered, so that the operational efficiency of trains can be improved under the premise of ensuring safety.

S42: Generate a second closing instruction for controlling the door of the second train to be closed according to the second train identifier when the signal is detected.

Specifically, when the logic control circuit board and signal system SIG detects that the signal indicating that the first train has left the platform is acquired, a second closing instruction for controlling the door of the second train to be closed may be generated according to the second train identifier.

In the present embodiment, it is detected whether a signal indicating that the first train has left the platform is acquired, and a second closing instruction for controlling the door of the second train to be closed is generated according to the second train identifier when the signal is detected, so that the operational efficiency of trains can be improved under the premise of ensuring safety.

S36: Control the door of the second train to be closed according to the second closing instruction, so as to control the opening and closing of the door of the first train and the door of the second train at different time points respectively.

Specifically, the logic control circuit board and signal system SIG controls the door of the second train to be closed according to the second closing instruction, the door of the second train is closed and locked, a signal indicating that the door of the second train is closed and locked is then transmitted to the logic control circuit board and signal system SIG, the logic control circuit board and signal system SIG allows the second train to depart, the second train leaves the platform, and the platform is emptied.

In the present embodiment, a first opening instruction for controlling the door of the first train to be opened is generated according to the first train identifier, and the opening of the door of the first train is controlled according to the first opening instruction; a second opening instruction for controlling the door of the second train to be opened is generated according to the second train identifier; the opening of the door of the second train is controlled according to the second opening instruction; a first closing instruction for controlling the door of the first train to be closed is generated according to the first train identifier, and the closing of the door of the first train is controlled according to the first closing instruction; a second closing instruction for controlling the door of the second train to be closed is generated according to the second train identifier; and the closing of the door of the second train is controlled according to the second closing instruction, so as to control the opening and closing of the door of the first train and the door of the second train at different time points respectively. The safety of train operation can be ensured, the operational efficiency of trains can be improved, and the flexibility of the train door control method can be improved.

In the present embodiment, when multiple trains park in a platform at the same time, a first train identifier and a second train identifier are acquired, where a door of a first train to which the first train identifier belongs is to be opened on at current time point, and a second train to which the second train identifier belongs is a train arranged after the first train, which enters the platform and parks in the platform; and the opening and closing of the door of the first train and a door of the second train are controlled at different time points respectively according to the first train identifier and the second train identifier. The safety of train operation can be ensured, the operational efficiency of trains can be improved, and the flexibility of the train door control method can be improved.

Figure 5:
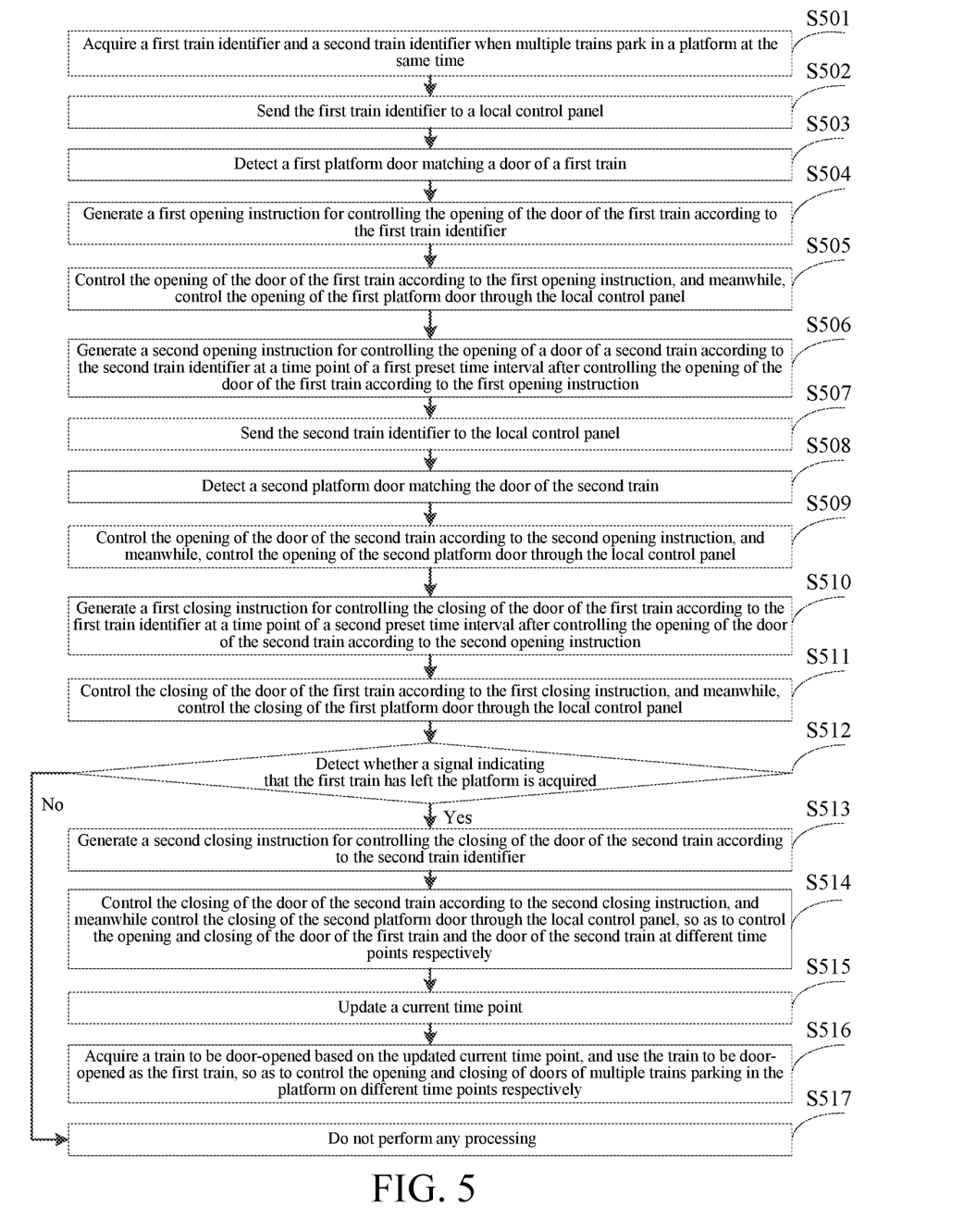
FIG. 5 is a schematic flowchart of a train door control method according to another embodiment of the present application.

FIG. 5 is a schematic flowchart of a train door control method according to another embodiment of the present application.

S501: Acquire a first train identifier and a second train identifier when multiple trains park in a platform at the same time.

A door of a first train to which the first train identifier belongs is to be opened at a current time point, and a second train to which the second train identifier belongs is a train arranged after the first train, which enters the platform and parks in the platform.

In an embodiment of the present application, the first train identifier is used to uniquely identify the first train and the second train identifier is used to uniquely identify the second train.

Specifically, when multiple trains park in the platform at the same time, that is, when a stop position of the first train at the platform is accurate and the door of the first train is to be opened at the current time point, the logic control circuit board and signal system SIG acquires a first train identifier to trigger a first opening instruction for opening the door of the first train; and after the second train stops accurately after the first train, the logic control circuit board and signal system SIG acquires a second train identifier to trigger a second opening instruction for opening the door of the second train.

S502: Send the first train identifier to a local control panel.

Specifically, when a stop position of the first train at the platform is accurate and the door of the first train is to be opened at the current time point, the logic control circuit board and signal system SIG sends the first train identifier to the local control panel to trigger the local control panel to control the opening of a first platform door.

S503: Detect a first platform door matching a door of a first train, where the first platform door is a platform door matching the door of the first train.

In the embodiment of the present invention, the first platform door is a platform door matching the door of the first train, and the local control panel detects the first platform door matching the door of the first train, so that the safety of train operation can be ensured.

S504: Generate a first opening instruction for controlling the door of the first train to be opened according to the first train identifier.

In the embodiment of the present application, the first opening instruction is used to control the door of the first train to be opened, and the first opening instruction may be triggered by the logic control circuit board and signal system SIG.

Specifically, when the door of the first train is to be opened at the current time point, the logic control circuit board and signal system SIG may generate a first opening instruction for controlling the door of the first train to be opened.

S505: Control the door of the first train to be opened according to the first opening instruction, and meanwhile, control the opening of the first platform door through the local control panel.

Specifically, when the logic control circuit board and signal system SIG controls the door of the first train to be opened according to the first opening instruction, the local control panel controls the opening of the first platform door, the door of the first train is opened, and then passengers get on and off the first train through the door. The personal safety of passengers can be guaranteed under the premise of ensuring the driving safety of trains.

S506: Generate a second opening instruction for controlling the opening of a door of a second train according to the second train identifier at a time point of a first preset time interval after controlling the door of the first train to be opened according to the first opening instruction.

The first preset time interval may be set by related technical staff of a train control center, or the first preset time interval may be set by a driver of the train. This is not limited thereto.

In the embodiment of the present application, the second opening instruction is used to control the door of the second train to be opened, and the second opening instruction may be triggered by the logic control circuit board and signal system SIG.

Specifically, the logic control circuit board and signal system SIG may generate a second opening instruction for controlling the door of the second train to be opened at a time point of a first preset time interval after the logic control circuit board and signal system SIG controls the door of the first train to be opened according to the first opening instruction. The orderly operation of trains when multiple trains park in the platform at the same time can be ensured.

S507: Send the second train identifier to the local control panel.

Specifically, after the second train stops steadily and accurately after the first train, the logic control circuit board and signal system SIG sends the second train identifier to the local control panel to trigger the local control panel to control the opening of a second platform door.

S508: Detect a second platform door matching the door of the second train.

In the embodiment of the present invention, the second platform door is a platform door matching the door of the second train, and the local control panel detects the second platform door matching the door of the second train, so that the safety of train operation can be ensured.

S509: Control the door of the second train to be opened according to the second opening instruction, and meanwhile, control the opening of the second platform door through the local control panel.

In the embodiment of the present application, the sum of the number of the doors of the first train and the number of the doors of the second train is less than or equal to the sum of the number of the first platform doors and the number of the second platform doors. When multiple trains park in the platform at the same time, the number of doors of multiple trains is less than or equal to the number of platform doors, which enables multiple trains to park in one platform, thereby improving the flexibility of the method.

Specifically, when the logic control circuit board and signal system SIG controls the door of the second train to be opened according to the second opening instruction, the local control panel controls the opening of the second platform door, the door of the second train is opened, and then passengers get on and off the second train. The personal safety of passengers can be guaranteed under the premise of ensuring the driving safety of trains.

S510: Generate a first closing instruction for controlling the door of the first train to be closed according to the first train identifier at a time point of a second preset time interval after controlling the door of the second train to be opened according to the second opening instruction.

The second preset time interval may be set by related technical staff of a train control center, or the second preset time interval may be set by a driver of the train, which is not limited thereto.

In the embodiment of the present application, the first preset time interval and the second preset time interval may be the same or different.

In the embodiment of the present application, the first closing instruction is used to control the door of the first train to be closed, and the first closing instruction may be triggered by the logic control circuit board and signal system SIG.

Specifically, the logic control circuit board and signal system SIG may generate a first closing instruction for controlling the door of the first train to be closed at a time point of a second preset time interval after controlling the door of the second train to be opened according to the second opening instruction, so as to control the door of the first train to be closed according to the first closing instruction.

S511: Control the door of the first train to be closed according to the first closing instruction, and meanwhile, control the closing of the first platform door through the local control panel.

Specifically, when the logic control circuit board and signal system SIG controls the door of the first train to be closed according to the first closing instruction, the local control panel controls the closing of the first platform door, and then the door of the first train is closed and locked. The personal safety of passengers can be guaranteed under the premise of ensuring the driving safety of trains.

S512: Detect whether a signal indicating that the first train has left the platform is acquired. If so, perform S513, and otherwise, perform S517.

Specifically, after the door of the first train is closed and locked, a signal indicating that the door of the first train is closed and locked is transmitted to the logic control circuit board and signal system SIG, the logic control circuit board and signal system SIG allows the first train to depart, the first train leaves the platform, and the logic control circuit board and signal system SIG detects whether a signal indicating that the first train has left the platform is acquired. When the logic control circuit board and signal system SIG detects that the signal indicating that the first train has left the platform is not acquired, the logic control circuit board and signal system SIG does not perform any processing. Only when the logic control circuit board and signal system SIG detects that the signal indicating that the first train has left the platform is acquired, a second closing instruction for closing the door of the second train can be triggered, so that the operational efficiency of trains can be improved under the premise of ensuring safety.

S513: Generate a second closing instruction for controlling the door of the second train to be closed according to the second train identifier.

In the embodiment of the present application, the second closing instruction is used to control the door of the second train to be closed, and the second closing instruction may be triggered by the logic control circuit board and signal system SIG.

Specifically, when the logic control circuit board and signal system SIG detects that the signal indicating that the first train has left the platform is acquired, a second closing instruction for controlling the door of the second train to be closed may be generated according to the second train identifier.

S514: Control the door of the second train to be closed according to the second closing instruction, and meanwhile, control the closing of the second platform door through the local control panel, so as to control the opening and closing of the door of the first train and the door of the second train at different time points respectively.

Specifically, when the logic control circuit board and signal system SIG controls the door of the second train to be closed according to the second closing instruction, the closing of the second platform door is controlled through the local control panel, the door of the second train is closed and locked, a signal indicating that the door of the second train is closed and locked is then transmitted to the logic control circuit board and signal system SIG, the logic control circuit board and signal system SIG allows the second train to depart, the second train leaves the platform, and the platform is emptied. Under the premise of ensuring the driving safety of trains, the personal safety of passengers can be guaranteed, and the operational efficiency of trains can be improved.

S515: Update the current time point.

Specifically, the current time point is updated to acquire a train to be door-opened based on the updated current time point. Trains on a platform can be dynamically monitored to ensure the orderly operation of the trains.

S516: Acquire a train to be door-opened based on the updated current time point, and use the train to be door-opened as the first train, so as to control the opening and closing of doors of multiple trains parking in the platform at different time points respectively.

Specifically, a train to be door-opened based on the updated current time point is acquired, and the train to be door-opened is used as the first train. That is, the train to be door-opened is used as the first train, the logic control circuit board and signal system SIG acquires the first train identifier so as to trigger subsequent control for the opening and closing of doors of multiple trains parking in the platform at different time points respectively. Trains on a platform can be dynamically monitored to ensure the orderly operation of the trains.

Figure 6:
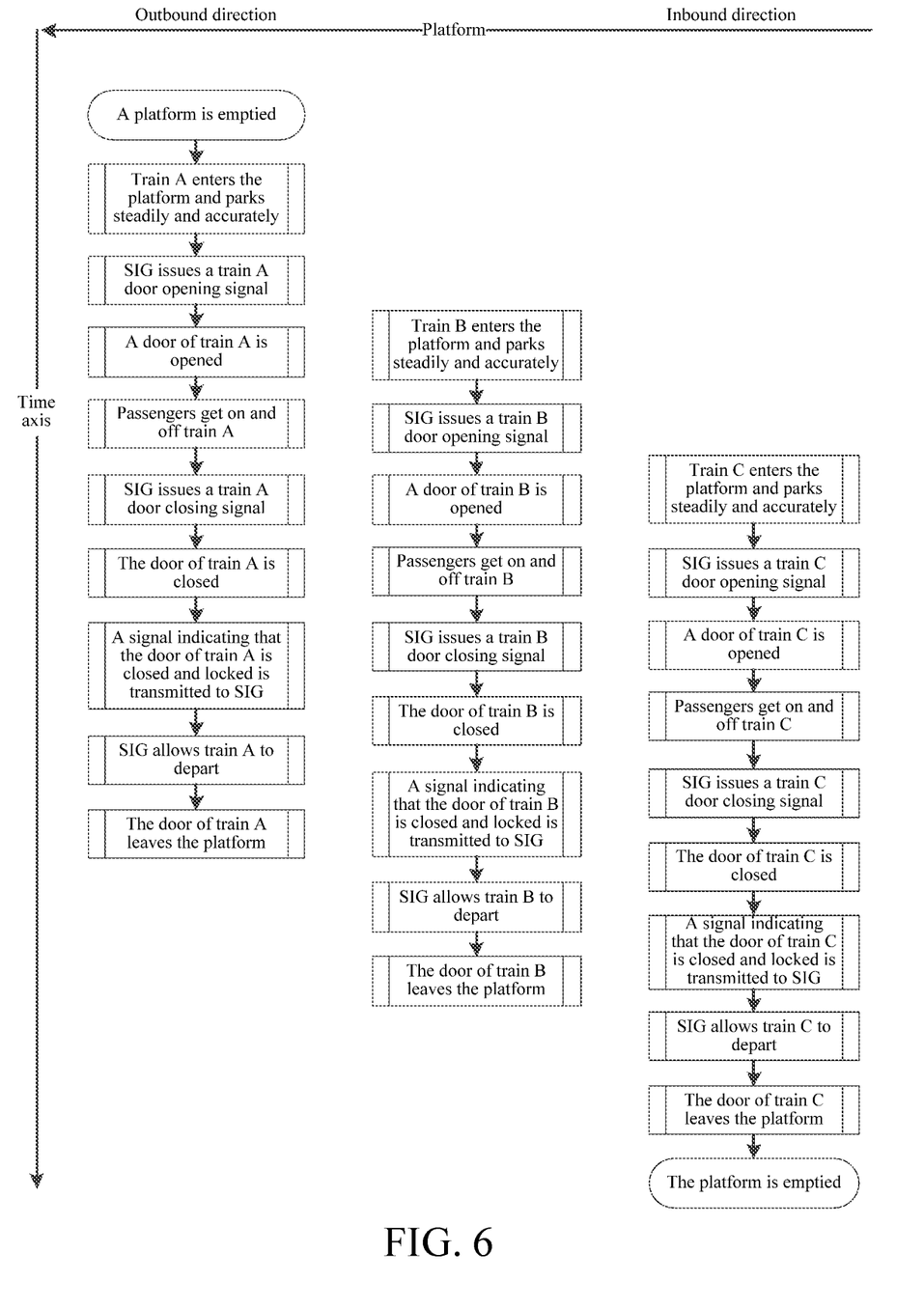
FIG. 6 is a schematic diagram of a time axis for controlling doors of multiple trains according to an embodiment of the present application.

As an example, referring to FIG. 6, FIG. 6 is a schematic diagram of a time axis for controlling doors of multiple trains according to an embodiment of the present application. For example, there are three trains. FIG. 6 shows an alternation process of three trains entering and leaving a platform under one time axis. As can be seen from FIG. 6, doors of multiple trains are controlled respectively, and there is a before-after related logical relationship therebetween, which can improve the operational efficiency of trains under the premise of ensuring safety.

S517: Not perform any processing.

Specifically, when the logic control circuit board and signal system SIG detects that the signal indicating that the first train has left the platform is not acquired, the logic control circuit board and signal system SIG does not perform any processing.

In the embodiments of the present invention, when multiple trains park in the platform at the same time, the logic control circuit board and signal system SIG sends the acquired first train identifier to the local control panel, and the local control panel detects the first platform door matching the door of the first train, so that the safety of train operation can be ensured. The first opening instruction for controlling the door of the first train to be opened is generated according to the first train identifier, and the opening of the door of the first train is controlled according to the first opening instruction. Meanwhile, the opening of the first platform door is controlled by the local control panel. The personal safety of passengers can be guaranteed under the premise of ensuring the driving safety of trains. The second train identifier is sent to the local control panel at the time point of the first preset time interval after controlling the door of the first train to be opened according to the first opening instruction. The local control panel detects the second platform door matching the door of the second train. The safety of train operation can be ensured, and the orderly operation of trains can be ensured. The logic control circuit board and signal system SIG controls the door of the second train to be opened according to the second opening instruction. Meanwhile, the local control panel controls the opening of the second platform door. The personal safety of passengers can be guaranteed under the premise of ensuring the driving safety of trains. The first closing instruction for controlling the door of the first train to be closed is generated according to the first train identifier at a time point of a second preset time interval after controlling the door of the second train to be opened according to the second opening instruction, and the closing of the door of the first train is controlled according to the first closing instruction. Meanwhile, the local control panel controls the closing of the first platform door. The personal safety of passengers can be guaranteed under the premise of ensuring the driving safety of trains. When detecting that the signal indicating that the first train has left the platform is acquired, the second closing instruction for controlling the door of the second train to be closed is generated according to the second train identifier, and the closing of the door of the second train is controlled according to the second closing instruction. Meanwhile, the local control panel controls the closing of the second platform door so as to control the opening and closing of the door of the first train and the door of the second train respectively at different time points. The personal safety of passengers can be guaranteed under the premise of ensuring the driving safety of trains, and the operational efficiency of trains can be improved. The current time point is updated, the train to be door-opened based on the updated current time point is acquired, and the train to be door-opened is used as the first train, so as to control the opening and closing of doors of multiple trains parking in the platform at different time points respectively. Trains on a platform can be dynamically monitored to ensure the orderly operation of the trains.

Figure 7:
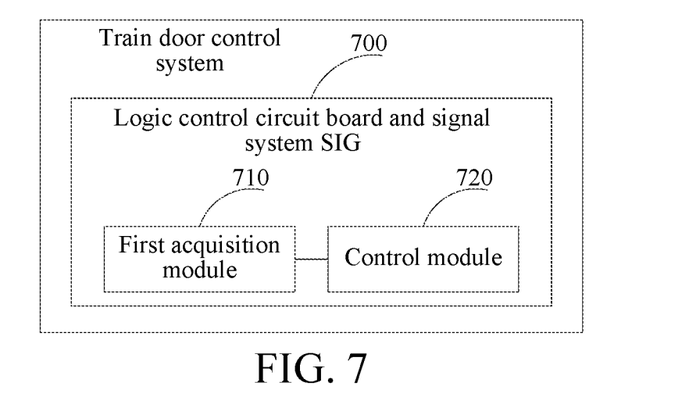
FIG. 7 is a schematic structure diagram of a train door control system according to an embodiment of the present application.

FIG. 7 is a schematic structure diagram of a train door control system according to an embodiment of the present application.

Referring to FIG. 7, the train door control system includes: a logic control circuit board and signal system SIG 700.

In the embodiment of the present application, the logic control circuit board and signal system SIG 700 includes: a first acquisition module 710 and a control module 720.

The first acquisition module 710 is configured to acquire a first train identifier and a second train identifier when multiple trains park in a platform at the same time, a door of a first train to which the first train identifier belongs being to be opened at a current time point, and a second train to which the second train identifier belongs being a train arranged behind the first train, which enters the platform and parks in the platform.

The control module 720 is configured to control the opening and closing of the door of the first train and a door of the second train at different time points respectively according to the first train identifier and the second train identifier.

Figure 8:
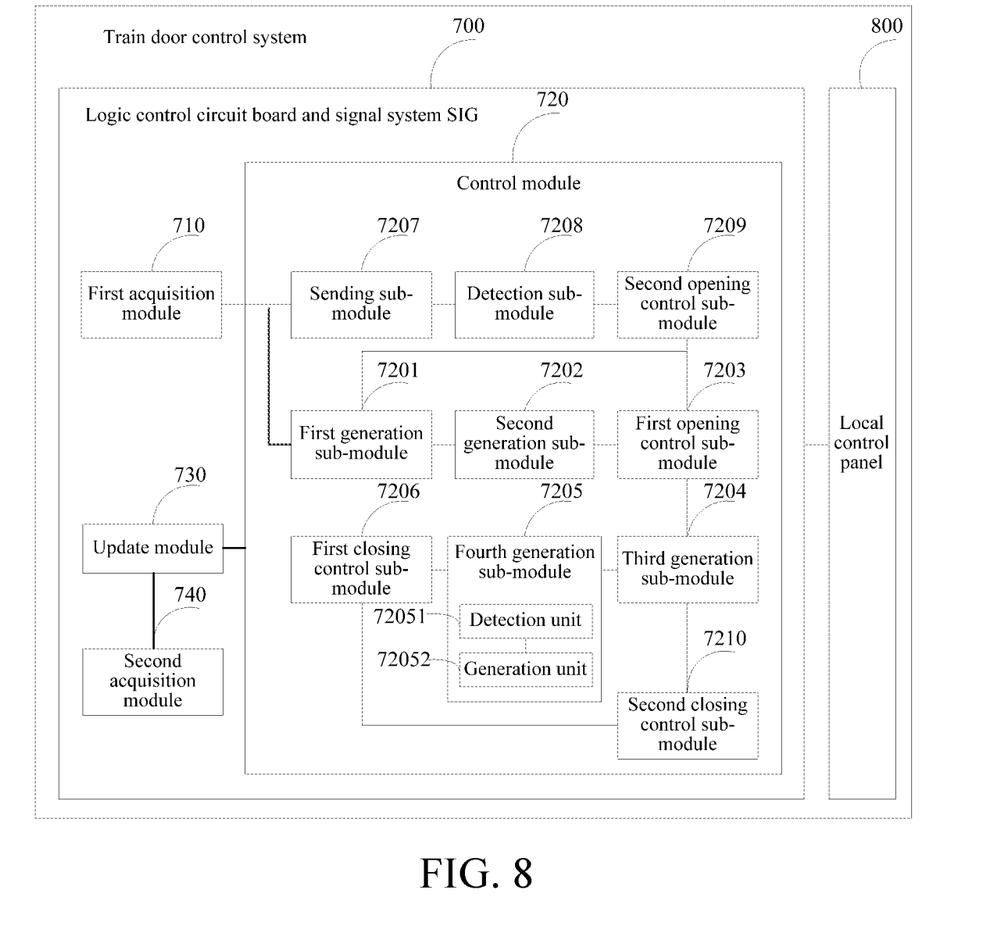
FIG. 8 is a schematic structure diagram of a train door control system according to another embodiment of the present application.

In some embodiments, referring to FIG. 8, the control module 720 includes: a first generation sub-module 7201, a second generation sub-module 7202, a first opening control sub-module 7203, a third generation sub-module 7204, a fourth generation sub-module 7205, and a first closing control sub-module 7206.

The first generation sub-module 7201 is configured to generate a first opening instruction for controlling the door of the first train to be opened according to the first train identifier, and control the door of the first train to be opened according to the first opening instruction.

The second generation sub-module 7202 is configured to generate a second opening instruction for controlling the door of the second train to be opened according to the second train identifier at a time point of a first preset time interval after controlling the door of the first train to be opened according to the first opening instruction.

The first opening control sub-module 7203 is configured to control the door of the second train to be opened according to the second opening instruction.

The third generation sub-module 7204 is configured to generate a first closing instruction for controlling the door of the first train to be closed according to the first train identifier at a time point of a second preset time interval after controlling the door of the second train to be opened according to the second opening instruction, and control the door of the first train to be closed according to the first closing instruction.

The fourth generation sub-module 7205 is configured to generate a second closing instruction for controlling the door of the second train to be closed according to the second train identifier after controlling the door of the first train to be closed according to the first closing instruction.

The first closing control sub-module 7206 is configured to control the door of the second train to be closed according to the second closing instruction, so as to control the opening and closing of the door of the first train and the door of the second train at different time points respectively.

In some embodiments, referring to FIG. 8, the train door control system further includes: a local control panel 800.

In the embodiment of the present application, the control module 720 further includes: a sending sub-module 708, a detection sub-module 709, a second opening control sub-module 710, and a second closing control sub-module 711.

The sending sub-module 7207 is configured to send the first train identifier or the second train identifier to the local control panel 800.

The detection sub-module 7208 is configured to detect a first platform door or a second platform door matching the door of the first train or the second train, where the first platform door is a platform door matching the door of the first train, and the second platform door is a platform door matching the door of the second train.

In the embodiment of the present application, the number of doors of multiple trains is less than or equal to the number of platform doors.

The second opening control sub-module 7209 is configured to control the opening of the first platform door or the second platform door through the local control panel 800 when controlling the door of the first train to be opened or the second train according to the first opening instruction or the second opening instruction.

The second closing control sub-module 7210 is configured to control the closing of the first platform door or the second platform door through the local control panel 800 when controlling the door of the first train to be closed or the second train according to the first closing instruction or the second closing instruction.

Alternatively, the fourth generation sub-module 7205 includes:

a detection unit 72051, configured to detect whether a signal indicating that the first train has left the platform is acquired; and a generation unit 72052, configured to generate a second closing instruction for controlling the door of the second train to be closed according to the second train identifier when the signal is detected.

In the embodiment of the present application, the logic control circuit board and signal system SIG 700 further includes: an update module 730 and a second acquisition module 740.

The update module 730 is configured to update the current time point.

The second acquisition module 740 is configured to acquire a train to be door-opened based on the updated current time point, and use the train to be door-opened as the first train, so as to control the opening and closing of doors of multiple trains parking in the platform at different time points respectively.

It is to be noted that the explanation of the embodiment of the train door control method in the foregoing embodiments of FIG. 1 to FIG. 6 is also applicable to the train door control system of the present embodiment, the implementation principle thereof is similar, and details are not described herein.

In the present embodiment, when multiple trains park in a platform at the same time, a first train identifier and a second train identifier are acquired, where a door of a first train to which the first train identifier belongs is to be opened at a current time point, and a second train to which the second train identifier belongs is a train arranged after the first train, which enters the platform and parks in the platform; and the opening and closing of the door of the first train and a door of the second train are controlled at different time points respectively according to the first train identifier and the second train identifier. The safety of train operation can be ensured, the operational efficiency of trains can be improved, and the flexibility of the train door control method can be improved.

It should be noted that in the description of the present application, the terms such as "first" and "second" are used for the purpose of description only and are not to be construed as indicating or implying relative importance. In addition, in the description of the present application, unless otherwise indicated, the meaning of "a plurality" is two or more.

Any process or method description in the flowchart or otherwise described herein may be construed as representing modules, segments, or portions of code comprising one or more executable instructions for implementing the operations of a particular logical function or process, and the scope of the preferred embodiments of the present application includes additional implementations. The functions may not be performed in the order shown or discussed. For example, the functions involved may be performed in a substantially simultaneous manner or in a reverse order. This should be understood by those skilled in the art to which the embodiments of the present application pertain.

It is to be understood that portions of the present application may be implemented through hardware, software, firmware, or a combination thereof. In the embodiments described above, various operations or methods may be implemented by software or firmware stored in a memory and executed by a suitable instruction execution system. For example, if implemented through hardware, as in another embodiment, the operations or methods may be implemented using any one or a combination of the following techniques known in the art: a discrete logic circuit having a logic gate for implementing a logic function on data signals, an application-specific integrated circuit having an appropriate combinational logic gate circuit, a programmable gate array (PGA), a field programmable gate array (FPGA), and the like.

A person of ordinary skill in the art may understand that all or some of the processes of the methods in the embodiments may be implemented by a program instructing relevant hardware. The program may be stored in a computer readable storage medium. When the program is executed, one or a combination of the operations of the method embodiments are performed.

In addition, functional units in the embodiments of this application may be integrated into one processing module, or each of the units may exist alone physically, or two or more units may be integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

The storage medium mentioned above may be a read-only memory, a magnetic disk, an optical disc, or the like.

In the description of the specification, the description made with reference to terms such as "one embodiment", "some embodiments", "example", "specific example", or "some examples" means that a specific characteristic, structure, material or feature described with reference to the embodiment or example is included in at least one embodiment or example of the present application. In this specification, exemplary descriptions of the foregoing terms do not necessarily refer to a same embodiment or example. In addition, the described specific features, structures, materials, or characteristics may be combined in an appropriate manner in any one or multiple embodiments or examples.

Although the embodiments of the present application are shown and described above, it may be understood that the foregoing embodiments are examples, and cannot be understood as limitations to the present application. A person of ordinary skill in the art may make changes, modifications, replacements, and variations to the foregoing embodiments without departing from the scope of the present application.

What is claimed is:

1. A train door control method, comprising:
   acquiring a first train identifier and a second train identifier when multiple trains park in a platform at the same time, wherein a door of a first train to which the first train identifier belongs is to be opened at a current time point, and a second train to which the second train identifier belongs is arranged behind the first train and parks in the platform; and
   controlling opening and closing of the door of the first train and a door of the second train at different time points respectively according to the first train identifier and the second train identifier.

2. The train door control method according to claim 1, wherein controlling the opening and closing of the door of the first train and a door of the second train at different time points respectively according to the first train identifier and the second train identifier comprises:
   generating a first opening instruction for controlling the door of the first train to be opened according to the first train identifier, and controlling the door of the first train to be opened according to the first opening instruction;
   generating a second opening instruction for controlling the door of the second train to be opened according to the second train identifier at a time point of a first preset time interval after controlling the door of the first train to be opened according to the first opening instruction;
   controlling the door of the second train to be opened according to the second opening instruction;
   generating a first closing instruction for controlling the door of the first train to be closed according to the first train identifier at a time point of a second preset time interval after controlling the door of the second train to be opened according to the second opening instruction, and controlling the door of the first train to be closed according to the first closing instruction;
   generating a second closing instruction for controlling the door of the second train to be closed according to the second train identifier after controlling the door of the first train to be closed according to the first closing instruction; and
   controlling the door of the second train to be closed according to the second closing instruction, so as to control the opening and closing of the door of the first train and the door of the second train at different time points respectively.

3. The train door control method according to claim 2, further comprising:
   sending the first train identifier to a local control panel;
   detecting a first platform door matching the door of the first train; and
   controlling, by the local control panel, the first platform door to be opened when controlling the door of the first train to be opened according to the first opening instruction;
   or
   sending the second train identifier to the local control panel;
   detecting a second platform door matching the door of the second train; and
   controlling, by the local control panel, the second platform door to be closed when controlling the door of the second train to be opened according to the second opening instruction.

4. The train door control method according to claim 3, further comprising:
   controlling the closing of the first platform door through the local control panel when controlling the door of the first train to be closed according to the first closing instruction;
   or
   controlling the closing of the second platform door through the local control panel when controlling the door of the second train to be closed according to the second closing instruction.

5. The train door control method according to claim 1, further comprising:
   updating the current time point; and
   acquiring a train to be door-opened based on the updated current time point, and using the train to be door-opened as the first train, so as to control the opening and closing of doors of the multiple trains parking in the platform at different time points respectively.

6. The train door control method according to claim 1, wherein
   a number of doors of the multiple trains is less than or equal to a number of doors of the platform.

7. The train door control method according to claim 2, wherein generating a second closing instruction for controlling the door of the second train to be closed according to the second train identifier after controlling the door of the first train to be closed according to the first closing instruction comprises:
   detecting whether a signal indicating that the first train has left the platform is acquired; and
   generating a second closing instruction for controlling the door of the second train to be closed according to the second train identifier when the signal is detected.

8. A train door control system, comprising a logic control circuit board and signal system SIG, wherein the logic control circuit board and signal system SIG comprises:
   a first acquisition module, configured to acquire a first train identifier and a second train identifier when multiple trains park in a platform at the same time, wherein a door of a first train to which the first train identifier belongs is to be opened at a current time point, and a second train to which the second train identifier belongs is arranged behind the first train and parks in the platform; and
   a control module, configured to control opening and closing of the door of the first train and a door of the second train at different time points respectively according to the first train identifier and the second train identifier.

9. The train door control system according to claim 8, wherein the control module comprises:
   a first generation sub-module, configured to generate a first opening instruction for controlling the door of the first train to be opened according to the first train identifier, and control the door of the first train to be opened according to the first opening instruction;

a second generation sub-module, configured to generate a second opening instruction for controlling the door of the second train to be opened according to the second train identifier at a time point of a first preset time interval after controlling the door of the first train to be opened according to the first opening instruction;

a first opening control sub-module, configured to control the door of the second train to be opened according to the second opening instruction;

a third generation sub-module, configured to generate a first closing instruction for controlling the door of the first train to be closed according to the first train identifier at a time point of a second preset time interval after controlling the door of the second train to be opened according to the second opening instruction, and control the door of the first train to be closed according to the first closing instruction;

a fourth generation sub-module, configured to generate a second closing instruction for controlling the door of the second train to be closed according to the second train identifier after controlling the door of the first train to be closed according to the first closing instruction; and a first closing control sub-module, configured to control the door of the second train to be closed according to the second closing instruction, so as to control the opening and closing of the door of the first train and the door of the second train at different time points respectively.

10. The train door control system according to claim 9, further comprising a local control panel, the control module further comprising:

a sending sub-module, configured to send the first train identifier to the local control panel;

a detection sub-module, configured to detect a first platform door matching the door of the first train; and a second opening control sub-module, configured to control the opening of the first platform door through the local control panel when controlling the door of the first train to be opened according to the first opening instruction;

or the sending sub-module, further configured to send the second train identifier to the local control panel;

the detection sub-module, further configured to detect a second platform door matching the door of the second train; and the second opening control sub-module, further configured to control the opening of the second platform door through the local control panel when controlling the door of the second train to be opened according to the second opening instruction.

11. The train door control system according to claim 10, wherein the control module further comprises:

a second closing control sub-module, configured to control the closing of the first platform door through the local control panel when controlling the door of the first train to be closed according to the first closing instruction, or further configured to control the closing of the second platform door through the local control panel when controlling the door of the second train to be closed according to the second closing instruction.

12. The train door control system according to claim 8, further comprising:

an update module, configured to update the current time point; and a second acquisition module, configured to acquire a train to be door-opened based on the updated current time point, and use the train to be door-opened as the first train, so as to control the opening and closing of doors of multiple trains parking in the platform at different time points respectively.

13. The train door control system according to claim 8, wherein a number of the doors of the multiple trains is less than or equal to a number of doors of the platform.

14. The train door control system according to claim 9, wherein the fourth generation sub-module comprises:

a detection unit, configured to detect whether a signal indicating that the first train has left the platform is acquired; and a generation unit, configured to generate a second closing instruction for controlling the door of the second train to be closed according to the second train identifier when the signal is detected.

15. A non-transitory computer-readable storage medium storing computer program instructions executable by at least one processor to perform:

acquiring a first train identifier and a second train identifier when multiple trains park in a platform at the same time, wherein a door of a first train to which the first train identifier belongs is to opened at a current time point, and a second train to which the second train identifier belongs is arranged behind the first train and parks in the platform; and controlling opening and closing of the door of the first train and a door of the second train at different time points respectively according to the first train identifier and the second train identifier.

16. The non-transitory computer-readable storage medium according to claim 15, wherein controlling the opening and closing of the door of the first train and a door of the second train at different time points respectively according to the first train identifier and the second train identifier comprises:

generating a first opening instruction for controlling the door of the first train to be opened according to the first train identifier, and controlling the door of the first train to be opened according to the first opening instruction;

generating a second opening instruction for controlling the door of the second train to be opened according to the second train identifier at a time point of a first preset time interval after controlling the door of the first train to be opened according to the first opening instruction;

controlling the door of the second train to be opened according to the second opening instruction;

generating a first closing instruction for controlling the door of the first train to be closed according to the first train identifier at a time point of a second preset time interval after controlling the door of the second train to be opened according to the second opening instruction, and controlling the door of the first train to be closed according to the first closing instruction;

generating a second closing instruction for controlling the door of the second train to be closed according to the second train identifier after controlling the door of the first train to be closed according to the first closing instruction; and controlling the door of the second train to be closed according to the second closing instruction, so as to control the opening and closing of the door of the first train and the door of the second train at different time points respectively.

* * * * *